(12) United States Patent
Choi

(10) Patent No.: US 10,921,910 B2
(45) Date of Patent: Feb. 16, 2021

(54) HIGH RESOLUTION TOUCH SENSOR

(71) Applicant: DONGWOO FINE-CHEM CO., LTD., Iksan-si (KR)

(72) Inventor: Byung Jin Choi, Siheung-si (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 39 days.

(21) Appl. No.: 16/353,350

(22) Filed: Mar. 14, 2019

(65) Prior Publication Data

US 2019/0286257 A1 Sep. 19, 2019

(30) Foreign Application Priority Data

Mar. 16, 2018 (KR) .................. 10-2018-0030999

(51) Int. Cl.
*G06F 3/0354* (2013.01)
*B32B 27/38* (2006.01)
*B32B 15/092* (2006.01)
*G06F 1/16* (2006.01)

(52) U.S. Cl.
CPC ........ *G06F 3/03547* (2013.01); *B32B 15/092* (2013.01); *B32B 27/38* (2013.01); *G06F 1/1643* (2013.01)

(58) Field of Classification Search
CPC .. G06F 3/03547; G06F 1/1643; G06F 3/0446; G06F 3/0443; G06F 2203/04114; G06F 2203/04103; G06F 2203/04111; B32B 15/092; B32B 27/38
See application file for complete search history.

(56) References Cited

U.S. PATENT DOCUMENTS

| 2010/0013784 | A1* | 1/2010 | Nashiki ................... G06F 3/041 345/173 |
| 2016/0254479 | A1* | 9/2016 | Jeong .................. H01L 51/5246 257/40 |
| 2017/0262099 | A1* | 9/2017 | Nathan ................. G06F 3/0414 |

FOREIGN PATENT DOCUMENTS

| KR | 10-2012-0075982 A | 7/2012 |
| KR | 10-2013-0005272 | 1/2013 |
| KR | 10-2013-0114820 A | 10/2013 |
| KR | 10-2013-0116583 A | 10/2013 |
| KR | 10-2016-0060533 | 5/2016 |
| KR | 10-2016-0105947 A | 9/2016 |
| KR | 10-2017-0110883 | 10/2017 |

* cited by examiner

*Primary Examiner* — Abbas I Abdulselam
(74) *Attorney, Agent, or Firm* — Sughrue Mion, PLLC

(57) ABSTRACT

Provided is a touch sensor capable of forming a fine pattern by forming a touch sensor pattern layer on an outgassing prevention layer so that both a finger input and a pen input can be detected.

26 Claims, 9 Drawing Sheets

[Figure 1]
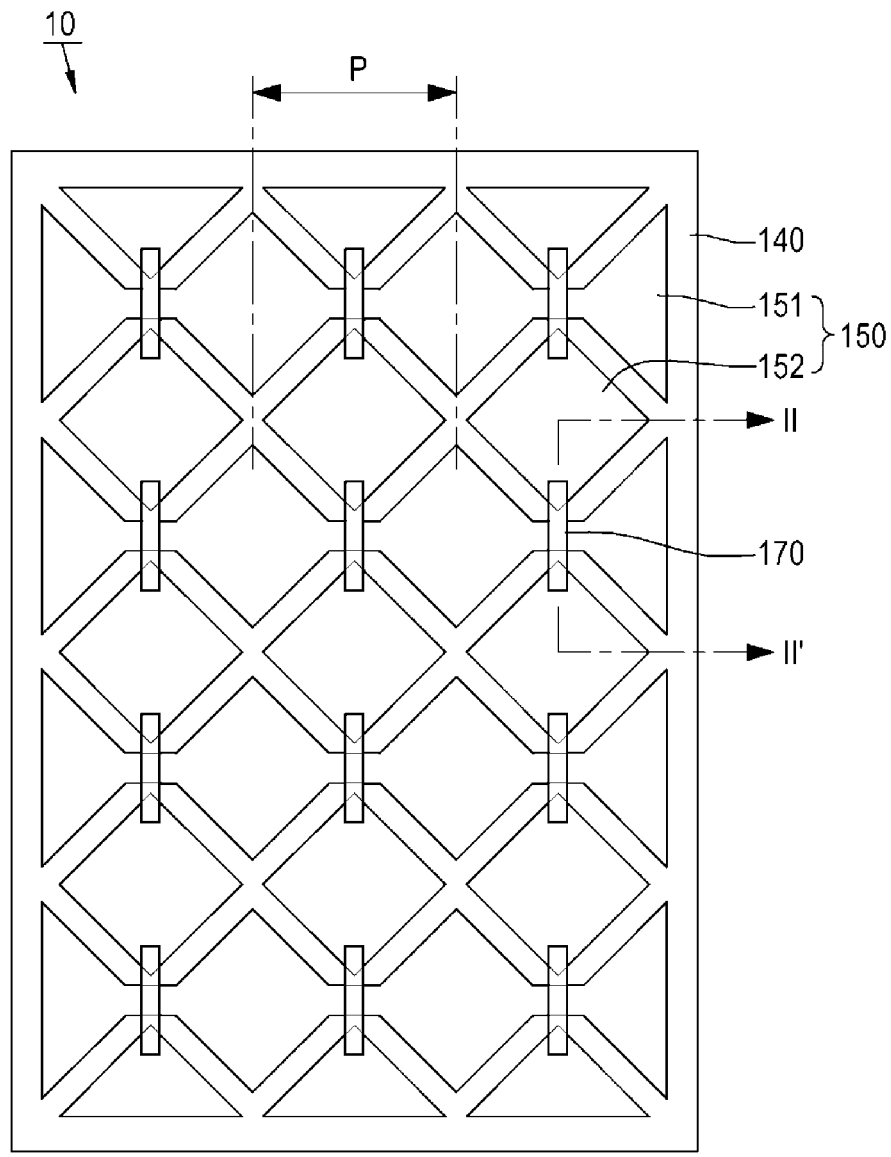

[Figure 2]
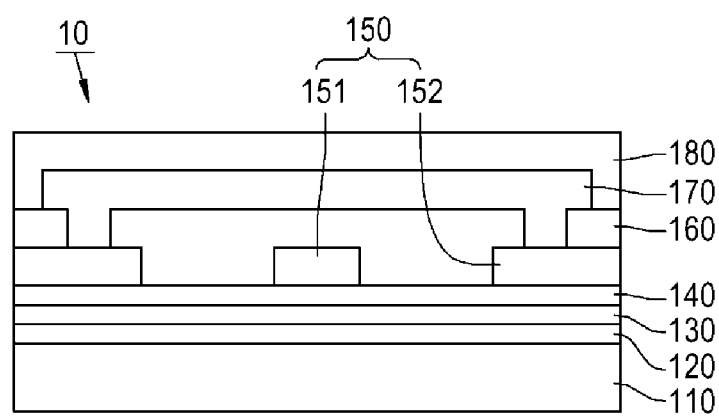
[Figure 3]
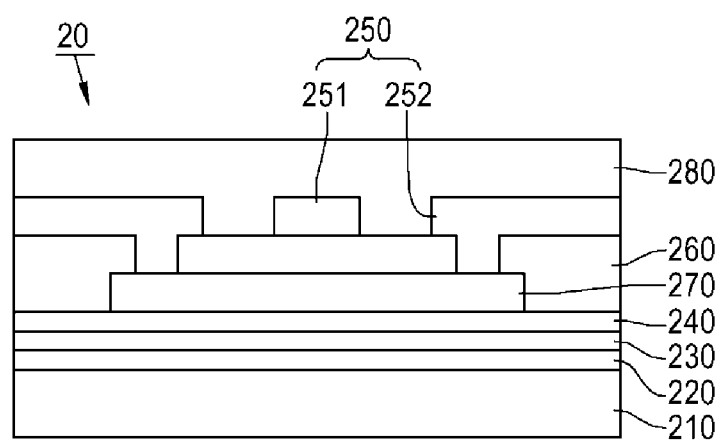

[Figure 4]
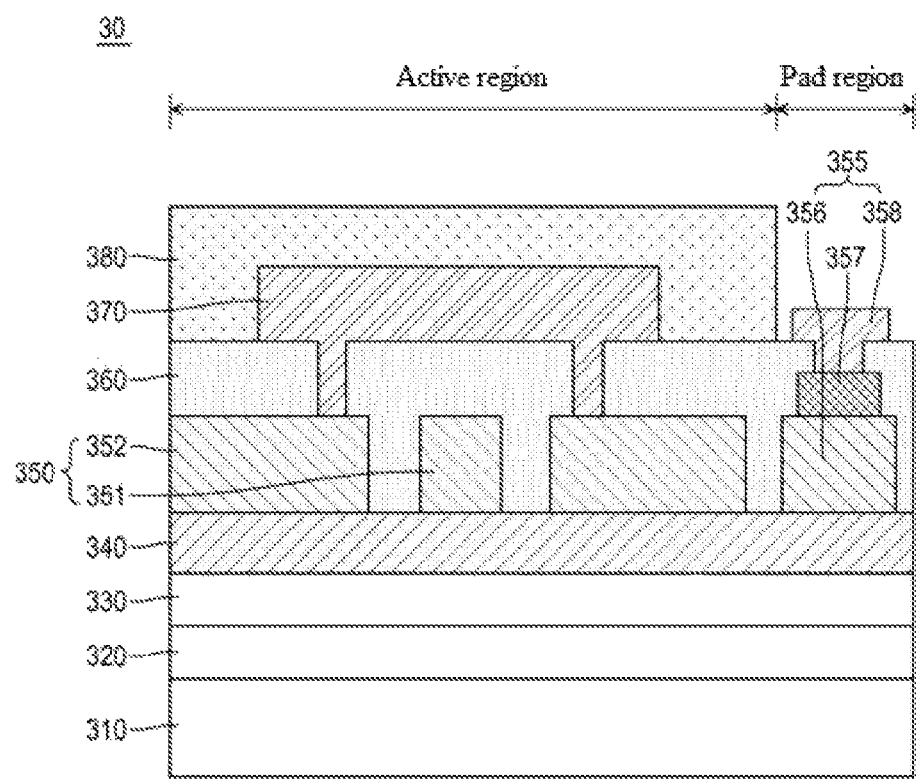

【Figure 5】
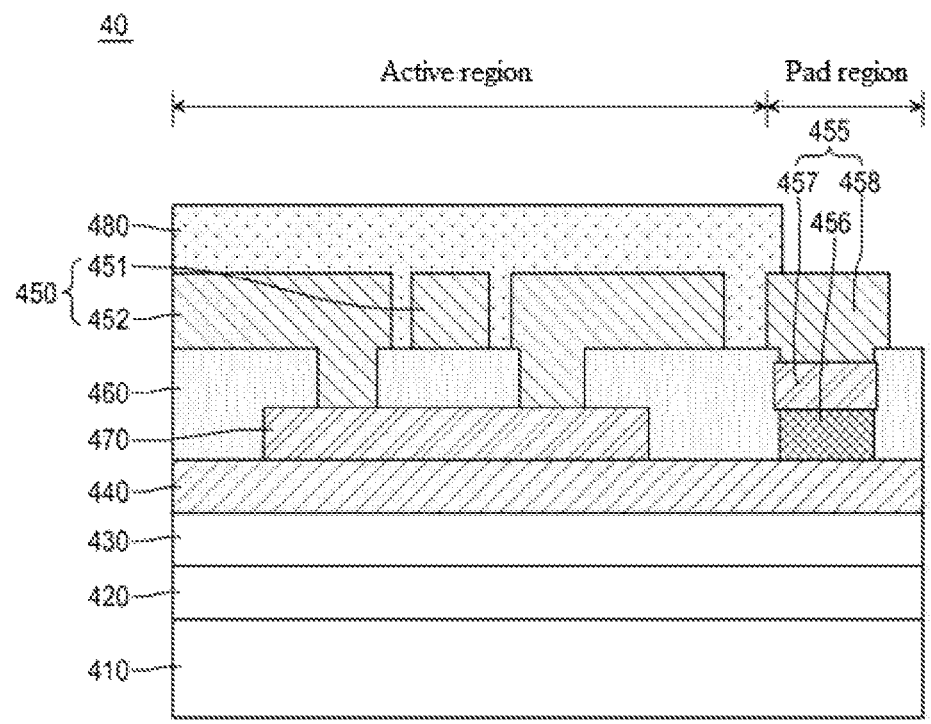

【Figure 6a】
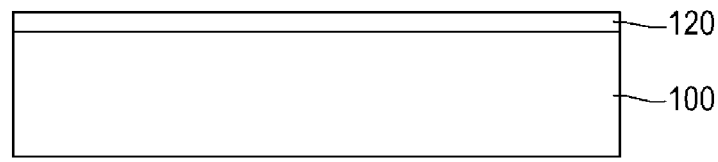
【Figure 6b】
【Figure 6c】
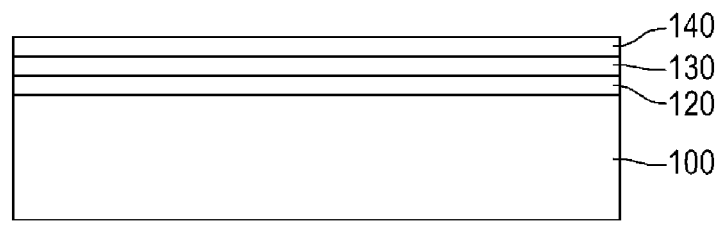
【Figure 6d】
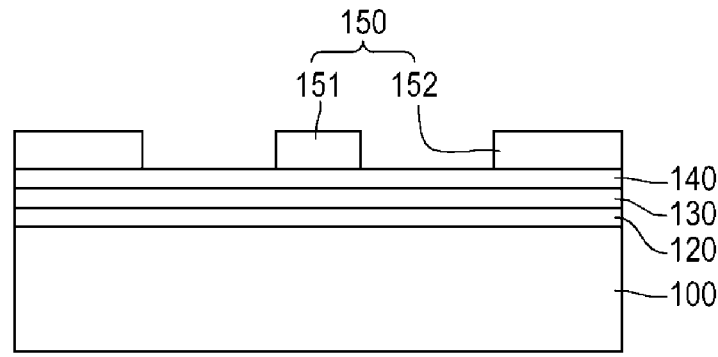

【Figure 6e】
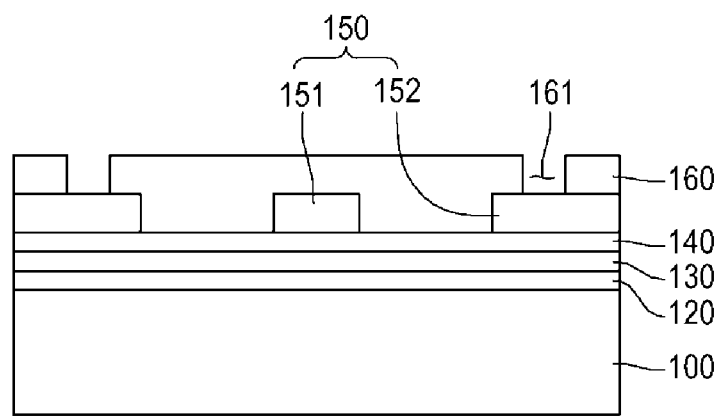
【Figure 6f】
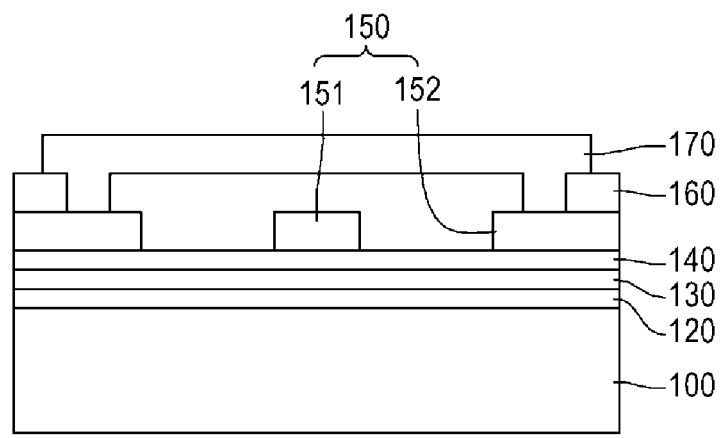

[Figure 6g]
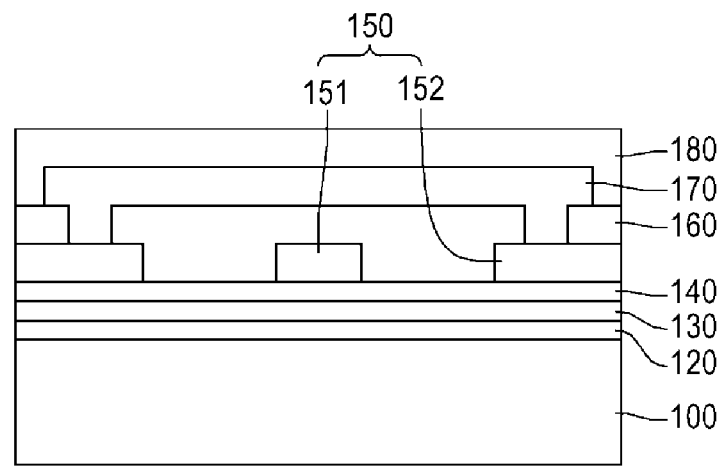
[Figure 6h]
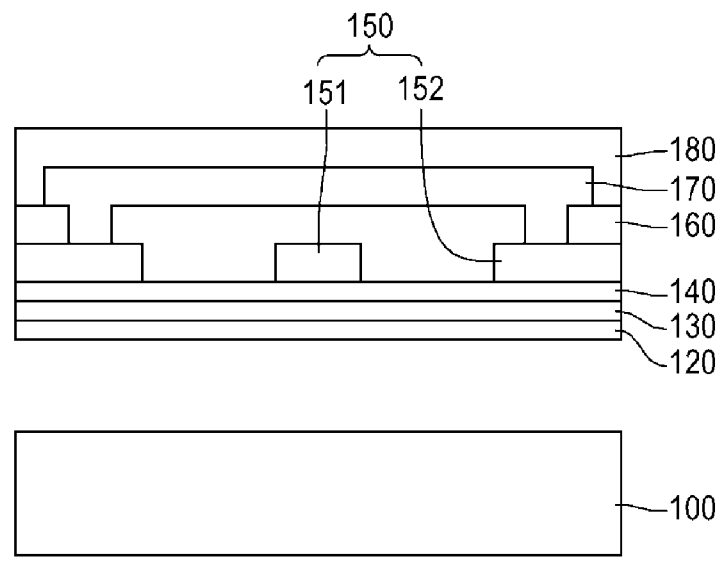

【Figure 6i】
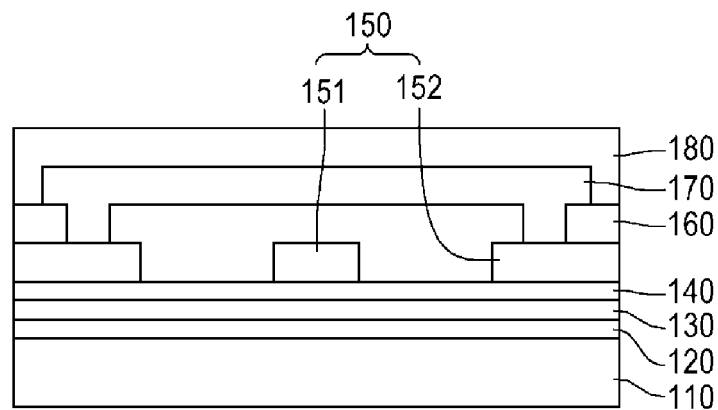
【Figure 7】
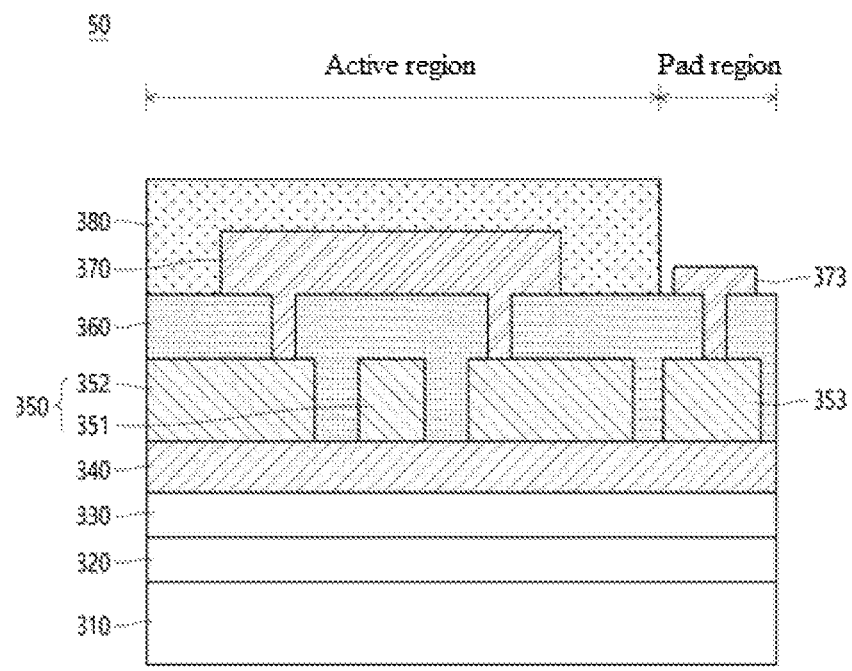

[Figure 8]
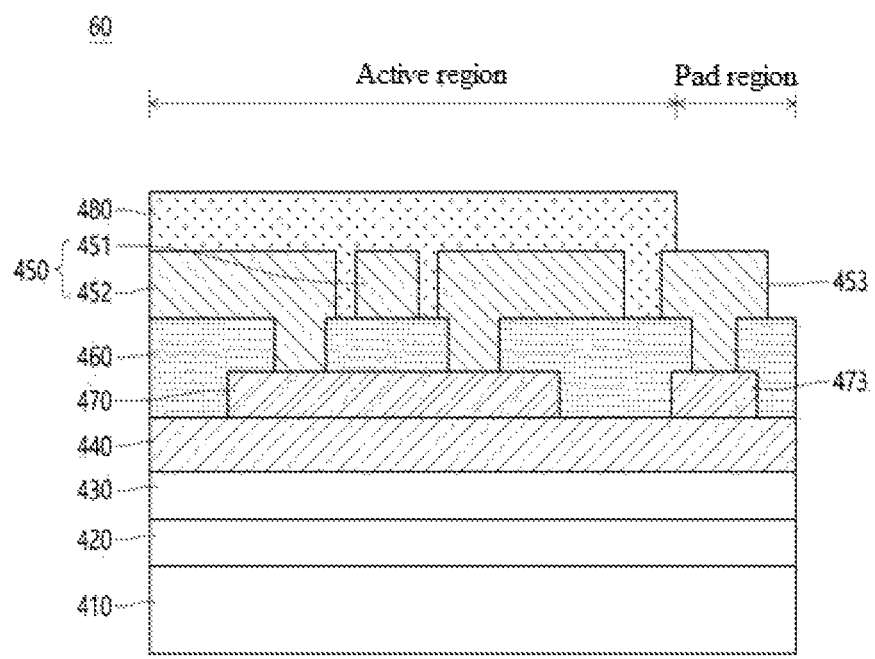

HIGH RESOLUTION TOUCH SENSOR

CROSS REFERENCE TO RELATED APPLICATIONS

This application claims priority based on Korean Patent Application No. 10-2018-0030999, filed Mar. 16, 2018, the content of which is incorporated herein by reference in its entirety.

TECHNICAL FIELD

The present invention relates to a touch sensor. Particularly, the present invention relates to a touch sensor with a fine pattern capable of sensing finger and pen inputs.

BACKGROUND ART

In recent display devices, a touch input method in which a user directly touches a screen using a finger to input is widely used. The touch input method can be combined with a display screen without a separate input device such as a keyboard and a mouse and provide an intuitive and convenient user interface by allowing a user to directly touch a specific location of the display screen to input.

Currently a capacitive type touch sensor is widely used, in which a transparent conductive material is used to form a touch sensing electrode layer of the touch sensor. The pattern of the touch sensing electrode layer includes a first sensing electrode pattern in the first direction and a second sensing electrode pattern in the second direction. In order to insulate the first and second sensing electrode patterns from each other, a bridge structure is used.

For example, Korean Patent Application Publication No. 10-2012-0075982 discloses a capacitive type touch sensor comprising: a substrate having a sensing region and a peripheral region; a plurality of first sensing electrodes arranged on the sensing region at regular intervals in a first direction; a plurality of second sensing electrodes formed on the sensing region and spaced apart from each other in a second direction perpendicular to the first direction; a first bridge electrode electrically connecting neighboring first sensing electrodes of the first sensing electrodes in the first direction; a second bridge electrode intersecting with the first bridge electrode and electrically connecting neighboring second sensing electrodes in the second direction; and an insulation pattern formed to insulate the first bridge electrode and the second bridge electrode from each other, to cover only the first bridge electrode and the adjacent region of the first bridge electrode, and to have contact holes exposing a part of the first bridge electrode on both outer sides of a region where the first bridge electrode and the second bridge electrode intersect, wherein the neighboring first sensing electrodes are electrically connected to each other through the contact holes.

Since the touch sensor is normally used by touching the screen with a finger, the sensing electrode pattern is formed in consideration of the finger size of a person. For example, Korean Patent Application Publication No. 10-2016-0105947 discloses a touch screen sensor including touch sensitive zones having 5 mm×5 mm square areas.

However, as functions of electronic devices using a touch sensor as an input means, such as a smartphone, become more diverse and complex, it is desirable to be able to sense precise touch inputs. Particularly, this need is increased when an auxiliary tool such as a pen is used instead of a finger.

DISCLOSURE OF INVENTION

Technical Problem

It is an object of the present invention to provide a touch sensor with a fine pattern capable of sensing finger and pen inputs.

Technical Solution

According to one aspect of the present invention, there is provided a touch sensor, comprising: a substrate; a separation layer on the substrate; a protective layer formed on the separation layer; an outgassing prevention layer formed on the protective layer; a bridge layer formed on the outgassing prevention layer; an insulation layer formed on the bridge layer; and a touch sensor pattern layer formed on the insulation layer and containing a transparent conductive material.

According to another aspect of the present invention, there is provided a touch sensor, comprising: a substrate; a separation layer on the substrate; a protective layer formed on the separation layer; an outgassing prevention layer formed on the protective layer; a touch sensor pattern layer formed on the outgassing prevention layer and containing a transparent conductive material; an insulation layer formed on the touch sensor pattern layer; and a bridge layer formed on the insulation layer.

In the touch sensor according to the present invention, the substrate may be a flexible film.

In the touch sensor according to the present invention, the outgassing prevention layer may be formed of an inorganic film.

In the touch sensor according to the present invention, the outgassing prevention layer may include a SiON layer.

In the touch sensor according to the present invention, the outgassing prevention layer may include a $SiO_2$ layer.

In the touch sensor according to the present invention, the outgassing prevention layer may include an epoxy-based, polycyclolefin-based, or acrylic-based resin.

In the touch sensor according to the present invention, the outgassing prevention layer may have a thickness of 10 nm to 5 μm.

In the touch sensor according to the present invention, the touch sensor pattern layer may have a pattern pitch of 0.5 mm to 3 mm.

In the touch sensor according to the present invention, the insulation layer may be made of an inorganic film.

The touch sensor according to the present invention may further comprise: a first pad electrode formed on the outgassing prevention layer in a pad region and including the same material as the bridge layer; and a second pad electrode formed on the first pad electrode and including the same material as the touch sensor pattern layer.

The touch sensor according to the present invention may further comprise: a first pad electrode formed on the outgassing prevention layer in a pad region and including the same material as the touch sensor pattern layer; and a second pad electrode formed on the first pad electrode and including the same material as the bridge layer.

The touch sensor according to the present invention may further comprise a third pad electrode formed between the first pad electrode and the second pad electrode and including a metallic material.

The touch sensor according to the present invention may further comprise a third pad electrode formed under the first pad electrode and including a metallic material.

In the touch sensor according to the present invention, the bridge layer may include a metallic material.

According to yet another aspect of the present invention, there is provided a touch sensor, comprising: a flexible film substrate; and a touch sensor pattern arranged on the flexible film substrate and having a pattern pitch of 0.5 mm to 3 mm.

The touch sensor according to the present invention may further comprise: a separation layer on the flexible film substrate; a protective layer on the separation layer; and an outgassing prevention layer on the protective layer, wherein the touch sensor pattern is located on the outgassing prevention layer.

Advantageous Effects

According to the touch sense or of the present invention, an outgassing prevention layer is formed to provide a planarized surface, to improve adhesion during the patterning process of the layer thereon, and to make the transparent conductive material forming a touch sensor pattern layer have a uniform resistance. Further, the outgassing prevention layer serves as an etch barrier layer during the patterning process of the layer thereon.

As a result, in the touch sensor according to the present invention, it is possible to form the touch sensor pattern layer having a pitch of 3 mm or less, and thus the touch input using the finger and the pen can be accurately detected.

In addition, the outgassing prevention layer makes it possible to form the touch sensor wiring with a line width of 10 μm or less, so that a narrow bezel area can be realized even if the number of channels of the touch sensor increases.

DESCRIPTION OF DRAWINGS

FIG. 1 is a schematic plan view of a touch sensor according to the first embodiment of the present invention.

FIG. 2 is a cross-sectional view of FIG. 1 along the line II-IF.

FIG. 3 is a schematic cross-sectional view of a touch sensor according to the second embodiment of the present invention.

FIGS. 4 and 5 are schematic cross-sectional views of touch sensors according to the third and fourth embodiments of the present invention, respectively.

FIGS. 6a to 6i are cross-sectional views illustrating a method of preparing a touch sensor according to the first embodiment of the present invention.

FIGS. 7 and 8 are schematic cross-sectional views of touch sensors according to the fifth and sixth embodiments of the present invention, respectively.

BEST MODE

Hereinafter, preferred embodiments of the present invention will be described in detail with reference to the accompanying drawings. However, the drawings accompanying the present disclosure are mere examples for describing the present invention, and the present invention is not limited by the drawings. Also, some elements may be exaggerated, scaled-down, or omitted in the drawing for clearer expressions.

The present invention provides a touch sensor capable of forming a fine pattern by preventing outgassing from organic layers underneath and improving planarity and adhesiveness.

FIG. 1 is a schematic plan view of a touch sensor according to the first embodiment of the present invention, and FIG. 2 is a cross-sectional view of FIG. 1 along the line II-II'.

Referring to FIG. 1, the touch sensor 10 according to the first embodiment of the present invention comprises a touch sensor pattern layer 150 having a plurality of touch sensing electrodes 151 and 152, which include a plurality of first touch sensing electrodes 151 arranged in a first direction (a horizontal direction in FIG. 1) and connected to each other as a single pattern and a plurality of second touch sensing electrodes 152 arranged in a second direction intersecting with the first direction (a vertical direction in FIG. 1) and connected to each other through bridges 170.

Referring to FIG. 2, the touch sensor 10 according to the first embodiment of the present invention comprises a substrate 110, a separation layer 120 on the substrate 110, a protective layer 130 formed on the separation layer 120, an outgassing prevention layer 140 formed on the protective layer 130, and the touch sensor pattern layer 150 formed on the outgassing prevention layer 140.

In an embodiment of the present invention, the substrate 110 may be a flexible film, in particular, a transparent film or a polarizing plate.

The transparent film is not limited if it has good transparency, mechanical strength and thermal stability. Specific examples of the transparent film may include thermoplastic resins, e.g., polyester resins such as polyethylene terephthalate, polyethylene isophthalate, polyethylene naphthalate and polybutylene terephthalate; cellulose resins such as diacetylcellulose and triacetylcellulose; polycarbonate resins; acrylate resins such as polymethyl (meth)acrylate and polyethyl (meth)acrylate; styrene resins such as polystyrene and acrylonitrile-styrene copolymer; polyolefin resins such as polyethylene, polypropylene, polyolefin having a cyclic or norbornene structure, and ethylene-propylene copolymer; vinyl chloride resins; amide resins such as nylon and aromatic polyamide; imide resins; polyethersulfone resins; sulfone resins; polyether ether ketone resins; polyphenylene sulfide resins; vinyl alcohol resins; vinylidene chloride resins; vinyl butyral resin; allylate resin; polyoxymethylene resins; and epoxy resins. Also, a film consisting of a blend of the thermoplastic resins may be used. In addition, thermally curable or UV curable resins such as (meth)acrylate, urethane, acrylic urethane, epoxy and silicon resins may be used.

Such a transparent film may have a suitable thickness. For example, considering workability in terms of strength and handling, or thin layer property, the thickness of the transparent film may range from 1 to 500 μm, preferably 1 to 300 μm, more preferably 5 to 200 μm.

The transparent film may contain at least one suitable additive. Examples of the additive may include an UV absorber, an antioxidant, a lubricant, a plasticizer, a releasing agent, a coloring-preventing agent, an anti-flame agent, an anti-static agent, a pigment and a colorant. The transparent film may comprise various functional layers including a hard coating layer, an anti-reflective layer and a gas barrier layer, but the present invention is not limited thereto. That is, other functional layers may also be included depending on the desired use.

If necessary, the transparent film may be surface-treated. For example, the surface treatment may be carried out by drying method such as plasma, corona and primer treatment, or by chemical method such as alkali treatment including saponification.

Also, the transparent film may be an isotropic film, a retardation film or a protective film.

In the case of the isotropic film, it is preferred to satisfy an in-plane retardation (Ro) of 40 nm or less, preferably 15 nm or less and a thickness retardation (Rth) of −90 nm to +75 nm, preferably −80 nm to +60 nm, particularly −70 nm to +45 nm, the in-plane retardation (Ro) and thickness retardation (Rth) being represented by the following equations.

$$Ro=[(nx-ny)\times d]$$

$$Rth=[(nx+ny)/2-nz]\times d$$

wherein, nx and ny are each a main refractive index in a film plane, nz is a refractive index in the thickness direction of film, and d is a thickness of film.

The retardation film may be prepared by uniaxial stretching or biaxial stretching of a polymer film, coating of a polymer or coating of a liquid crystal, and it is generally used for improvement or control of optical properties, e.g., viewing angle compensation, color sensitivity improvement, light leakage prevention, or color control of a display.

The retardation film may include a half-wave (½) or quarter-wave (¼) plate, a positive C-plate, a negative C-plate, a positive A-plate, a negative A-plate, and a biaxial plate.

The protective film may be a polymer resin film comprising a pressure-sensitive adhesive (PSA) layer on at least one surface thereof, or a self-adhesive film such as a polypropylene.

The polarizing plate may be any one known to be used in a display panel.

Specifically, PVA (polyvinyl alcohol), TAC (triacetyl cellulose), or COP (cycloolefin polymer) based films can be used, but the present invention is not limited thereto.

The separation layer 120 is a layer formed for peeling off from a carrier substrate after the preparation of the touch sensor is completed in the manufacturing process of the present invention. Accordingly, the separation layer 120 can be separated from the carrier substrate by a physical force and it is laminated on the film substrate 110 after separation.

The protective layer 130 is to protect the separation layer 120 and formed on the separation layer 120.

In an embodiment of the present invention, the separation layer 120, or the protective layer 130, or both the separation layer 120 and the protective layer 130 may be formed of organic layers to provide a flexible touch sensor.

The organic layers may be made of polymer. The polymer may comprise at least one selected from the group consisting of polyacrylate, polymethacrylate (e.g., PMMA), polyimide, polyamide, poly vinyl alcohol, polyamic acid, polyolefin (e.g., PE, PP), polystyrene, polynorbornene, phenylmaleimide copolymer, polyazobenzene, polyphenylenephthalamide, polyester (e.g., PET, PBT), polyarylate, cinnamate polymer, coumarin polymer, phthalimidine polymer, chalcone polymer and aromatic acetylene polymer.

The organic material comprised in the separation layer 120, or the protective layer 130, or both of the separation layer 120 and the protective layer 130 may cause outgassing during the manufacturing process. The gas generated from the organic material causes non-uniformity in the film forming process thereon and may also damage the layer thereon, resulting in difficulties in formation of a fine pattern.

In order to solve such a problem, the outgassing prevention layer 140 composed of an inorganic film or an organic film is formed on the protective layer 130 in an embodiment of the present invention.

The outgassing prevention layer 140 may be formed of an inorganic layer, and may be a single layer or a laminated layer containing a metal oxide or a metal nitride. Specifically, it may include any one of SiNx, SiON, $Al_2O_3$, $SiO_2$, and $TiO_2$. For example, the outgassing prevention layer 140 may be formed of a SiON layer or a $SiO_2$ layer, or a double layer of SiON and $SiO_2$.

The thickness of the outgassing prevention layer 140 may be 10 nm to 5 μm.

When the thickness of the outgassing prevention layer is less than 10 nm, the outgassing prevention effect is insufficient, which causes unevenness of film formation. When the thickness is larger than 5 μm, cracks may occur when the touch sensor is separated from the carrier substrate after manufacturing.

More preferably, the thickness of the outgassing prevention layer 140 may be 10 nm to 1000 nm, For example, when the outgassing prevention layer 140 is formed of a single layer of a SiON layer or a $SiO_2$ layer, the thickness of the single layer can be 10 nm to 400 nm. When the outgassing prevention layer 140 is formed of a double layer of SiON and $SiO_2$, the thickness of each layer may be 10 nm to 200 nm.

The outgassing prevention layer 140 may be formed of an organic layer. As the material of the organic layer, an insulation material known in the art may be used without limitation. A photosensitive resin composition or a thermosetting resin composition may be used.

The outgassing prevention layer 140 may be formed of, for example, an epoxy-based, polycyclolefin-based, or acrylic-based material, and may have a thickness of 10 nm to 5 μm.

Alternatively, the outgassing prevention layer 140 may be a gas barrier film. The barrier film may have a structure that an organic layer and an inorganic layer are stacked alternately.

The inorganic layer deposited as the outgassing prevention layer 140 or the inorganic layer included in the barrier film may be formed to prevent moisture permeation.

As the outgassing prevention layer 140 is formed on the protective layer 130, the gas generated from the protective layer 130 and the separation layer 120 under the outgassing prevention layer 140 can be blocked not to affect the layer thereon during the film forming and patterning process. Specifically, when the outgassing is prevented, the transparent conductive material forming the touch sensor pattern layer 150 formed on the outgassing prevention layer 140 can have a uniform resistance.

Also, the outgassing prevention layer 140 can be used as a functional layer that facilitates formation of a fine electrode pattern on the outgassing prevention layer 140. That is, by forming the outgassing prevention layer 140, the surface is planarized and the adhesion with the transparent conductive material forming the touch sensor pattern layer 150 is improved in the patterning process. Thus, the etching rate can be precisely controlled and the etched cross-section of the transparent conductive material can be formed to have a forward tapered shape instead of a reverse tapered shape, thereby enabling to form a fine pattern.

In addition, the outgassing prevention layer 140 can perform the function of the etch barrier layer in the patterning process thereon. For example, the separation layer 120 and the protective layer 130 located under the outgassing prevention layer 140 can be protected against damage while dry etching other inorganic layers such as an insulation layer that can be formed over the outgassing prevention layer 140.

In the first embodiment of the present invention, the touch sensor pattern layer 150 is formed on the outgassing prevention layer 140.

Here, each of the touch sensing electrodes 151 and 152 may be a unit capable of sensing a touch input. The width of one unit forming a repetitive pattern including the space between the touch sensing electrodes 151 and 152 may be defined as the pitch of the touch sensing electrode pattern, which is denoted by P, as shown in FIG. 1.

According to the first embodiment of the present invention, by forming the touch sensor pattern layer 150 on the outgassing prevention layer 140, it is possible to obtain a fine touch sensor pattern having a pitch of 3 mm or less, for example, 0.5 mm to 3 mm owing to the function of the outgassing prevention layer 140 described above. As a result, it is possible to accurately detect not only the input using a finger but also the input using a pen having a smaller touch area than the finger.

The touch sensor pattern layer 150 is a transparent conductive layer, which may be formed of one or more materials selected from metal meshes, metal nanowires, metal oxides, carbon nanotubes, graphene, conductive polymers and conductive inks.

Here, the metal forming metal meshes may be any one of gold, silver, copper, molybdenum, aluminum, palladium, neodymium, platinum, zinc, tin, titanium or alloys thereof.

Examples of the metal nanowire may include silver nanowire, copper nanowire, zirconium nanowire, and gold nanowire.

Examples of the metal oxide may include indium tin oxide (ITO), indium zinc oxide (IZO), indium zinc tin oxide (IZTO), aluminum zinc oxide (AZO), gallium zinc oxide (GZO), fluorine-doped tin oxide (FTO), and zinc oxide (ZnO).

Also, the touch sensor pattern layer 150 may be formed of carbon materials such as carbon nanotube (CNT) and graphene.

The conductive polymer may comprise polypyrrole, polythiophene, polyacetylene, PEDOT and polyaniline, and the conductive ink may be a mixture of metal powder and a curable polymer binder.

If necessary, the touch sensor pattern layer 150 may consist of two or more conductive layers so as to reduce electric resistance.

For example, the touch sensor pattern layer 150 may consist of a single layer of ITO, AgNW (silver nanowire) or a metal mesh, or two or more layers comprising a first electrode layer of a transparent metal oxide such as ITO, and a second electrode layer of a metal or AgNW formed on the ITO electrode layer so as to lower electric resistance.

An insulation layer 160 is formed on the touch sensor pattern layer 150 to electrically isolate the first touch sensing electrode 151 and the second touch sensing electrode 152 from each other.

A plurality of second touch sensing electrodes 152 which belong to cells constituting individual sensing areas respectively and are separated from each other are connected via bridges 170 through holes in the insulation layer 160.

The insulation layer 160 may be formed over the entire surface of the touch sensor pattern layer 150, or may be patterned to have an island shape on a connecting portion where the first touch sensing electrodes 151 are connected to each other.

In the first embodiment of the present invention, the insulation layer 160 may be formed of an inorganic layer.

As described above, an inorganic layer can be used as the insulation layer 160 because the outgassing prevention layer 140 can protect the separation layer 120 and the protective layer 130 from damage during dry etching process of the insulation layer 160.

The bridge 170 is formed on the insulation layer 160 to electrically connect the second touch sensing electrodes 152 to each other.

The bridge 170 can be made of any conductive material, for example, a metal. Here, the metal may be any one of gold, silver, copper, molybdenum, aluminum, palladium, neodymium, platinum, zinc, tin, titanium or alloys thereof.

A passivation layer 180 is formed on the bridge 170.

The passivation layer 180 may be formed of an organic layer or an inorganic layer.

As a material of the passivation layer 180, an insulating material known in the art may be used without limitation. For example, a non-metal oxide such as silicon oxide or a photosensitive resin composition including an acrylic resin or a thermosetting resin composition may be used.

The passivation layer 180 may be formed of, for example, an epoxy-based material, and may have a thickness of 10 nm to 5 μm.

The passivation layer 180 may be formed of, for example, a polycycloolefin-based material, and may have a thickness of 10 nm to 5 μm.

Also, the passivation layer 180 may be formed of, for example, an acrylic-based organic insulation film material, and may have a thickness of 10 nm to 5 μm.

Meanwhile, although it is not shown in FIGS. 1 and 2, a pad electrode may be formed together with the touch sensor pattern layer 150 and the bridge 170 in a pad region outside of an active region where the touch sensor pattern layer 150 and the bridge 170 are formed.

That is, a first pad electrode is formed in the pad region on the outgassing prevention layer 140 in the same layer as the touch sensor pattern layer 150, and a second pad electrode is formed on the first pad electrode in the same layer as the bridge 170 to form the pad electrode having a double layer structure.

Meanwhile, the first embodiment of the present invention described with reference to FIGS. 1 and 2 has a structure that the touch sensor pattern layer 150, insulation layer 160 and bridge 170 are laminated sequentially on the outgassing prevention layer 140. However, the lamination structure of the touch sensor pattern layer 150, insulation layer 160 and bridge 170 is not limited thereto. Rather, it may have an oppositely laminated structure.

FIG. 3 is a schematic cross-sectional view of a touch sensor according to the second embodiment of the present invention having a lamination structure opposite to the embodiment shown in FIGS. 1 and 2.

As shown in FIG. 3, in the touch sensor 20 according to the second embodiment of the present invention a bridge 270 is formed first on a lamination structure of a substrate 210, a separation layer 220, a protective layer 230 and an outgassing prevention layer 240.

The details of the substrate 210, separation layer 220, protective layer 230 and outgassing prevention layer 240 are the same as those of the first embodiment of the present invention described with reference to FIGS. 1 and 2. Thus, the detailed description thereof will be omitted.

An insulation layer 260 is formed on the bridge 270 and the insulation layer 260 has holes to electrically connect the second touch sensing electrodes 252 to be formed on the insulation layer 260 to each other via the bridge 270.

Materials and structures of the bridge 270 and insulation layer 260 are the same as those of the first embodiment of the present invention described with reference to FIGS. 1 and 2.

A touch sensor pattern layer 250 including a plurality of first touch sensing electrodes 251 connected to each other and a plurality of second touch sensing electrodes 252 connected to each other via the bridge 270 is formed on the insulation layer 260, and a passivation layer 280 is formed on the touch sensor pattern layer 250.

Materials and structures of the touch sensor pattern layer 250 and passivation layer 280 are the same as those of the first embodiment of the present invention described with reference to FIGS. 1 and 2.

Similar to the first embodiment of the present invention, a pad electrode may also be formed in a pad region in the second embodiment of the present invention. According to the second embodiment of the present invention, a first pad electrode may be formed on the outgassing prevention layer 240 in the pad region in the same layer as the bridge 270, and a second pad electrode may be formed on the first pad electrode in the same layer as the touch sensor pattern layer 250.

Meanwhile, in order to improve the visibility of the touch sensor, both the touch sensor pattern and the bridge of the active region can be formed using a transparent conductive material. FIGS. 4 and 5 are cross-sectional views of touch sensors according to the third and fourth embodiments of the present invention, respectively.

First, referring to FIG. 4, the touch sensor 30 according to the third embodiment of the present invention comprises a substrate 310, a separation layer 320 formed on the substrate 310, a protective layer 330 formed on the separation layer 320, an outgassing prevention layer 340 formed on the protective layer 330, and a touch sensor pattern layer 350 formed on the outgassing prevention layer 340.

The touch sensor pattern layer 350 includes a plurality of first touch sensing electrodes 351 and a plurality of second touch sensing electrodes 352 in an active region, and a first pad electrode 356 is formed in a pad region.

The first touch sensing electrode 351, second touch sensing electrode 352 and first pad electrode 356 may be formed of a transparent conductive material.

For example, one or more materials selected from metal meshes, metal nanowires, metal oxides, carbon nanotubes, graphene, conductive polymers and conductive inks may be used, and, in particular, a metal oxide such as ITO may be used.

A third pad electrode 357 containing a metallic material is formed on the first pad electrode 356 made of a transparent conductive material.

The third pad electrode 357 may be made of any one of gold, silver, copper, molybdenum, aluminum, palladium, neodymium, platinum, zinc, tin, titanium or alloys thereof. Alternatively, the third pad electrode 357 may consist of two or more layers including one or more of the metals described above. For example, the third pad electrode 357 may have a multi-layer structure of metallic materials or a multi-layer structure of non-metallic material/metallic material/non-metallic material.

An insulation layer 360 is formed on the first touch sensing electrode 351, second touch sensing electrode 352 and third pad electrode 357.

The insulation layer 360 may be formed of an organic layer, and it may be formed over the entire surface and patterned to have holes exposing the second touch sensing electrode 352 and third pad electrode 357 similar to the first embodiment of the present invention. Alternatively, it may be patterned to have an island shape on a connecting portion where the first touch sensing electrodes 351 are connected to each other.

A bridge 370 and second pad electrode 358 are formed on the insulation layer 360.

As described above, the bridge 370 may also be formed of a transparent conductive material similar to that used for the touch sensor pattern layer 350 to improve the visibility of the touch sensor according to the third embodiment.

Here, the second pad electrode 358 made of a transparent conductive material may be formed on the third pad electrode 357 containing a metallic material in the pad region to prevent corrosion of the pad electrode.

Meanwhile, although it is not shown in FIG. 4, a touch sensor line for connecting the touch sensor pattern to a driving unit is formed during the process of forming the pad electrode 355 in the pad region.

According to an embodiment of the present invention, when a fine touch sensor pattern having a pitch of 3 mm or less is formed, the number of channels of the touch sensor increases and the number of the touch sensor lines increases accordingly. Correspondingly, the touch sensor line may be formed finely to have a line width of 10 μm or less, for example, 1 μm to 10 μm.

The formation of the touch sensor line with the line width as fine as 10 μm or less is facilitated by the function of the outgassing prevention layer 140 enabling fine pattern formation of the electrode pattern formed thereon as described above. Accordingly, even if the number of channels increases, a narrow bezel area can be realized.

A passivation layer 380 is formed on the bridge 370 over the entire area of the active region.

The passivation layer 380 may be formed of an organic layer or an inorganic layer as in the first embodiment of the present invention.

The details of the substrate 310, separation layer 320, protective layer 330 and outgassing prevention layer 340 of the third embodiment of the present invention are the same as those of the first embodiment of the present invention described with reference to FIGS. 1 and 2. Thus, the detailed description thereof will be omitted.

FIG. 5 is a schematic cross-sectional view of a touch sensor according to the fourth embodiment of the present invention in which the lamination structure of the touch sensing electrode and the bridge is formed as opposed to the third embodiment of the present invention shown in FIG. 4.

Referring to FIG. 5, in the touch sensor 40 according to the fourth embodiment of the present invention, a third pad electrode 456 containing a metallic material is formed in a pad region on a lamination structure comprising a substrate 410, a separation layer 420, a protective layer 430, and an outgassing prevention layer 440, and a first pad electrode 457 on the third pad electrode 456 and a bridge 470 in the active region are formed of a transparent conductive material.

As the material and structure of the third pad electrode are the same as those of the third embodiment of the present invention described with reference to FIG. 4, the detailed description thereof is omitted.

An insulation layer 460 is formed on the bridge 470 and the first pad electrode 457, and a plurality of first touch sensing electrodes 451, a plurality of second touch sensing electrode 452, and a second pad electrode 458 are formed on the insulation layer 460. The plurality of second touch sensing electrodes 452 are electrically connected to each other through the insulation layer 460 via the bridge 470.

The details of other components are the same as those of the third embodiment of the present invention. Thus, the detailed description thereof will be omitted.

Meanwhile, the third pad electrode 456 containing a metallic material is formed on the outgassing prevention layer 440 and the first pad electrode 457 made of a transparent conductive material is formed on the third pad electrode 456 in the touch sensor according to the fourth embodiment of the present invention shown in FIG. 5. However, the positions of the third and first pad electrodes 456 and 457 may be interchanged.

Now, a method for preparing a touch sensor according to an embodiment of the present invention will be described in detail.

For preparing the touch sensor of the present invention, a carrier substrate is used to carry out a process to form a touch sensor, and then the carrier substrate can be separated and a film substrate can be attached instead.

FIGS. 6a to 6i are cross-sectional views schematically showing procedures for preparing a touch sensor according to the first embodiment of the present invention.

First, referring to FIG. 6a, a carrier substrate 100 is prepared, a composition for forming a separation layer is applied, and the separation layer 120 is formed.

The carrier substrate 100 is preferably a glass, but is not limited thereto. That is, other kinds of substrate may be used if they are heat-resistant materials that can endure a process temperature for electrode formation and maintain planarization without deformation at a high temperature.

As the material of the separation layer 120, a polymer organic film as described above can be used.

The formation of the separation layer may be carried out by a conventional coating method known in the art. For example, spin coating, die coating, spray coating, roll coating, screen coating, slit coating, dip coating, gravure coating and the like may be mentioned. Or, an inkjet method may be used.

After coating, the separation layer 120 is subject to curing by way of thermal curing or UV curing. These thermal curing and UV curing may be carried out alone or in combination thereof. In the case of thermal curing, an oven or hot plate may be used. Heating temperature and time depend on compositions, and, for example, curing may be performed at 80 to 250° C. for 10 to 120 minutes.

Next, as shown in FIG. 6b, a protective layer 130 is formed on the separation layer 120.

The material of the composition for forming the protective layer, the coating method and the curing procedure are as described above for the separation layer.

Now, as shown in FIG. 6c, an outgassing prevention layer 140 is formed by depositing SiON.

Meanwhile, the outgassing prevention layer 140 may be formed of a double layer of $SiO_2$ and SiON. In this case, the outgassing prevention layer 140 may be formed by sequentially depositing $SiO_2$ and SiON.

Alternatively, SiON may be deposited first and $SiO_2$ may be deposited later to form a double layer, or the outgassing prevention layer 140 may be formed of a single layer of $SiO_2$.

Next, as shown in FIG. 6d, a transparent conductive film is formed and patterned to form a touch sensor pattern layer 150 including a first touch sensing electrode 151 and a second touch sensing electrode 152. The patterning of the transparent conductive film may be performed by a photolithography process using a photosensitive resist.

The photosensitive resist may be a negative type or a positive type.

As the surface is planarized and the adhesion is improved to make the etched cross-section of the transparent conductive material to have a forward tapered shape instead of a reverse tapered shape due to the outgassing prevention layer 140 in the patterning process of the touch sensor pattern layer 150, it is possible to form a fine pattern of the touch sensor pattern layer 150. Also, resistance of the touch sensor pattern layer 150 becomes uniform.

Now, as shown in FIG. 6e, an insulation layer 160 is formed on the touch sensor pattern layer 150.

According to the touch sensor of the first embodiment of the present invention, the insulation layer 160 may be formed of an inorganic film.

When the insulation layer 160 is formed of an inorganic film, it can be deposited using a known process in the art such as CVD.

The insulation layer 160 is patterned to have a through hole 161 exposing a portion of the second touch sensing electrode 152 to electrically connect a plurality of second touch sensing electrodes 152 to each other.

In the touch sensor according to the first embodiment of the present invention, the outgassing prevention layer 140 provides the functionality of protecting the separation layer 120 and protective layer 130 located under the outgassing prevention layer 140 during dry etching process so that the insulation layer 160 can be patterned without damaging underlying layers even if the insulation layer 160 is formed of an inorganic film.

If the insulation layer 160 is formed of an inorganic film, the insulation layer 160 can be thinned to a thickness of 150 nm to 300 nm to be applicable to a flexible display device.

If necessary, the inorganic film may be formed to have a double layer structure to further improve flexibility. For example, the insulation layer 160 may be formed of a double layer of inorganic films each of which has a thickness of 150 nm, to obtain durability against folding of over 200,000 times at a room temperature and 1R.

Next, as shown in 6f, a bridge 170 is formed on the insulation layer 160.

The bridge 170 may be made of a conductive material, in particular, metal, and the metal layer can be deposited by a process such as CVD, PVD, PECVD without limitation.

Next, as shown in FIG. 6g, a passivation layer 180 is formed to cover entire portions of the touch sensor pattern layer 150 and the bridge 170.

The passivation layer 180 may be formed of an inorganic film or an organic film.

When the passivation layer 180 is formed of an inorganic film, it can be deposited using a known process in the art such as CVD.

When the passivation layer 180 is formed of an organic film, it can be applied using a known coating method in the art. For example, spin coating, die coating, spray coating, roll coating, screen coating, slit coating, dip coating, gravure coating and the like may be used.

Then, as shown in FIG. 6h, the separation layer 120 on which the touch sensor is formed is separated from the carrier substrate 100 used for carrying out a preparation process of the touch sensor. The process of separating the carrier substrate 100 from the separation layer 120 is performed at room temperature. It can be performed by, for example, physical peeling of the carrier substrate 100 which is a glass substrate from the separation layer 120.

Examples of the peeling method may include lift-off and peel-off, without limitation.

For the peeling, a force of 1N/25 mm or less, preferably 0.1N/25 mm or less may be applied, and the force may be varied depending on the peeling strength of the separation layer. If the peeling strength exceeds 1N/25 mm, the film touch sensor may be broken during peeling from the carrier substrate and an excessive force may be applied to the film touch sensor, thereby causing the deformation of the film touch sensor and failing to function as a device.

Next, as shown in FIG. 6i, a flexible film substrate 110 is attached to the surface of the separation layer 120 from which the carrier substrate 100 is peeled off. As the film substrate 110, various films as described above can be used.

Though it is not shown in the drawings, the film substrate 110 can be adhered to the separation layer 120 using an adhesive layer, and a photo-curable adhesive may be used. As the photo-curable adhesive does not need a separate drying process after photo curing, the fabrication process is simple. As a result, the productivity increases. In the present invention, photo-curable adhesives available in the art may be used without particular limitation. For example, a composition comprising an epoxy compound or acrylic monomer may be used.

For curing of the adhesive layer, light such as far ultraviolet ray, ultraviolet ray, near ultraviolet ray, infrared ray, electromagnetic wave such as X ray, γ ray may be used, and electron beam, proton beam, neutron beam as well. However, UV curing is advantageous in terms of curing speed, availability of curing device, cost, and so on.

A high pressure mercury lamp, electrodeless lamp, extra high pressure mercury lamp, carbon arc lamp, xenon lamp, metal halide lamp, chemical lamp, black light and the like can be used as a light source of UV curing.

Now, a method for preparing a touch sensor 30 in FIG. 4 according to the third embodiment of the present invention will be described in detail. The cross-sectional view of FIG. 4 is referred while describing the method for preparing the touch sensor according to the third embodiment of the present invention, and a detailed description of components similar to the preparation method of the touch sensor 10 in FIGS. 1 and 2 according to the first embodiment of the present invention will be omitted.

First, a carrier substrate is prepared, and a separation layer 320, a protective layer 330, and an outgassing prevention layer 340 are sequentially formed on the carrier substrate.

Next, a transparent conductive layer is formed on the outgassing prevention layer 340 and patterned to form a touch sensor pattern layer 350 including a first touch sensing electrode 351 and a second touch sensing electrode 352 in an active region and to form a first pad electrode 356 in a pad region.

Then, a third pad electrode 357 is formed on the first pad electrode 356.

As described above, the third pad electrode 357 may have a single layer structure of metal or a multi-layer structure comprising metal.

Next, an insulation layer 360 is formed and patterned on the touch sensor pattern layer 350.

In the touch sensor according to the third embodiment of the present invention, the insulation layer 360 may be formed of an organic film.

If the insulation layer 360 is formed of an organic film, it may be more advantageous in terms of flexibility When the insulation layer 360 is formed of an organic film, it can be applied using a known coating method in the art. For example, spin coating, die coating, spray coating, roll coating, screen coating, slit coating, dip coating, gravure coating and the like may be used.

Next, a bridge 370 is formed on the insulation layer 360, and a second pad electrode 358 is formed on the third pad electrode 357 at the same time.

Now, a passivation layer 380 is formed on the bridge 370, the separation layer 320 on which the touch sensor is formed is separated from the carrier substrate, and a flexible film substrate 310 is attached to the surface of the separation layer 320 from which the carrier substrate is peeled off, thereby forming the touch sensor as illustrated in FIG. 4.

A method for preparing a touch sensor 40 in FIG. 5 according to the fourth embodiment of the present invention will be described in detail. The cross-sectional view of FIG. 5 is referred while describing the method for preparing the touch sensor according to the fourth embodiment of the present invention, and a detailed description of components similar to the preparation method of the touch sensor 20 in FIG. 3 according to the second embodiment of the present invention will be omitted.

First, a carrier substrate is prepared, and a separation layer 420, a protective layer 430, and an outgassing prevention layer 440 are sequentially formed on the carrier substrate.

A third pad electrode 456 is formed on the outgassing prevention layer 440 in a pad region. The third pad electrode 456 may have a single layer structure of metal or a multi-layer structure comprising metal.

A transparent conductive film or a conductive metallic film is formed on the outgassing prevention layer 440 and patterned to form a bridge layer 470 in an active region and a first pad electrode 457.

An insulation layer 460 is formed and patterned on the bridge layer 470 and the third and first pad electrodes 456 and 457.

A touch sensor pattern layer 450 including a first touch sensing electrode 451 and a second touch sensing electrode 452 is formed on the insulation layer 460 with holes and a second pad electrode 458 is formed in the pad region.

A passivation layer 480 is formed on the touch sensor pattern layer 450, the separation layer 420 on which the touch sensor is formed is separated from the carrier substrate, and a flexible film substrate 410 is attached to the surface of the separation layer 420 from which the carrier substrate is peeled off, thereby forming the touch sensor as illustrated in FIG. 5.

FIGS. 7 and 8 are schematic cross-sectional views of touch sensors according to the fifth and sixth embodiments of the present invention, respectively.

As shown in FIG. 7, the touch sensor 50 of the fifth embodiment has two layers of pad electrodes 353 and 373 in the pad region in the touch sensor of the first embodiment.

The first pad electrode 353 may be formed on the outgassing prevention layer 340 when the touch sensor pattern layer 350 is formed. The first pad electrode 353 may be formed of the same material as the touch sensor pattern layer 350, for example, a transparent conductive material.

The second pad electrode 373 may be formed on the first pad electrode 353 when the bridge layer 370 is formed. The second pad electrode 373 may be formed of the same material as the bridge layer 370, for example, a transparent conductive material or a metallic material.

As shown in FIG. 8, the touch sensor 60 of the sixth embodiment has two layers of pad electrodes 473 and 453 in the pad region in the touch sensor of the second embodiment.

The first pad electrode 473 may be formed on the outgassing prevention layer 440 when the bridge layer 470 is formed. The first pad electrode 473 may be formed of the same material as the bridge layer 470, for example, a transparent conductive material or a metallic material.

The second pad electrode 453 may be formed on the first pad electrode 473 when the touch sensor pattern layer 450 is formed. The second pad electrode 453 may be formed of the same material as the touch sensor pattern layer 450, for example, a transparent conductive material.

Although particular embodiments and examples of the present invention have been shown and described, it will be understood by those skilled in the art that it is not intended to limit the present invention to the preferred embodiments, and it will be obvious to those skilled in the art that various changes and modifications may be made without departing from the spirit and scope of the invention.

The scope of the present invention, therefore, is to be defined by the appended claims and equivalents thereof.

DESCRIPTION OF REFERENCE NUMERALS 10, 20, 30, 40, 50, 60: touch sensor
100: carrier substrate
110, 210, 310, 410: substrate
120, 220, 320, 420: separation layer
130, 230, 330, 430: protective layer
140, 240, 340, 440: outgassing prevention layer
150, 250, 350, 450: touch sensor pattern layer
151, 251, 351, 451: first touch sensing electrode
152, 252, 352, 452: second touch sensing electrode
160, 260, 360, 460: insulation layer
170, 270, 370, 470: bridge
180, 280, 380, 480: passivation layer
355, 455: pad electrode
353, 356, 457, 473: first pad electrode
358, 373, 453, 458: second pad electrode
357, 456: third pad electrode

The invention claimed is:

1. A touch sensor, comprising:
a substrate;
a separation layer on the substrate;
a protective layer formed on the separation layer;
an outgassing prevention layer formed on the protective layer;
a bridge layer formed on the outgassing prevention layer;
an insulation layer formed on the bridge layer;
a touch sensor pattern layer formed on the insulation layer and containing a transparent conductive material;
a first pad electrode formed on the outgassing prevention layer in a pad region and including the same material as the bridge layer, wherein the first pad electrode and the bridge layer are formed in a same process; and
a second pad electrode formed on the first pad electrode and including the same material as the touch sensor pattern layer, wherein the second pad electrode and the touch sensor pattern layer are formed in a same process.

2. The touch sensor according to claim 1, wherein the substrate is a flexible film.

3. The touch sensor according to claim 1, wherein the outgassing prevention layer is formed of an inorganic film.

4. The touch sensor according to claim 3, wherein the outgassing prevention layer includes a SiON layer.

5. The touch sensor according to claim 4, wherein the outgassing prevention layer further includes a $SiO_2$ layer.

6. The touch sensor according to claim 3, wherein the outgassing prevention layer includes a $SiO_2$ layer.

7. The touch sensor according to claim 1, wherein the outgassing prevention layer includes an epoxy-based, polycycloolefin-based, or acrylic-based resin.

8. The touch sensor according to claim 1, wherein the outgassing prevention layer has a thickness of 10 nm to 5 µm.

9. The touch sensor according to claim 1, wherein the touch sensor pattern layer has a pattern pitch of 0.5 mm to 3 mm.

10. The touch sensor according to claim 1, wherein the insulation layer is made of an inorganic film.

11. The touch sensor according to claim 1, further comprising a third pad electrode formed between the first pad electrode and the second pad electrode and including a metallic material.

12. The touch sensor according to claim 1, further comprising a third pad electrode formed under the first pad electrode and including a metallic material.

13. The touch sensor according to claim 1, wherein the bridge layer includes a metallic material.

14. A touch sensor, comprising:
a substrate;
a separation layer on the substrate;
a protective layer formed on the separation layer;
an outgassing prevention layer formed on the protective layer;
a touch sensor pattern layer formed on the outgassing prevention layer and containing a transparent conductive material;
an insulation layer formed on the touch sensor pattern layer;
a bridge layer formed on the insulation layer;
a first pad electrode formed on the outgassing prevention layer in a pad region and including the same material as the touch sensor pattern layer, wherein the first pad electrode and the touch sensor pattern layer are formed in a same process; and
a second pad electrode formed on the first pad electrode and including the same material as the bridge layer, wherein the second pad electrode and the bridge layer are formed in a same process.

15. The touch sensor according to claim 14, wherein the substrate is a flexible film.

16. The touch sensor according to claim 14, wherein the outgassing prevention layer is formed of an inorganic film.

17. The touch sensor according to claim 16, wherein the outgassing prevention layer includes a SiON layer.

18. The touch sensor according to claim 17, wherein the outgassing prevention layer further includes a $SiO_2$ layer.

19. The touch sensor according to claim 16, wherein the outgassing prevention layer includes a $SiO_2$ layer.

20. The touch sensor according to claim 14, wherein the outgassing prevention layer includes an epoxy-based, polycycloolefin-based, or acrylic-based resin.

21. The touch sensor according to claim 14, wherein the outgassing prevention layer has a thickness of 10 nm to 5 µm.

22. The touch sensor according to claim 14, wherein the touch sensor pattern layer has a pattern pitch of 0.5 mm to 3 mm.

23. The touch sensor according to claim 14, wherein the insulation layer is made of an inorganic film.

24. The touch sensor according to claim 14, further comprising a third pad electrode formed between the first pad electrode and the second pad electrode and including a metallic material.

25. The touch sensor according to claim 14, further comprising a third pad electrode formed under the first pad electrode and including a metallic material.

26. The touch sensor according to claim 14, wherein the bridge layer includes a metallic material.

\* \* \* \* \*